(12) United States Patent
Baumgaertner

(10) Patent No.: US 12,005,932 B2
(45) Date of Patent: Jun. 11, 2024

(54) METHOD AND DEVICE FOR AUTOMATING A DRIVING FUNCTION

(71) Applicant: Robert Bosch GmbH, Stuttgart (DE)

(72) Inventor: Rainer Baumgaertner, Pfaffenhofen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 16/944,083

(22) Filed: Jul. 30, 2020

(65) Prior Publication Data
US 2021/0078606 A1 Mar. 18, 2021

(30) Foreign Application Priority Data
Sep. 17, 2019 (DE) .......................... 102019214161.7

(51) Int. Cl.
*B60W 60/00* (2020.01)
*B60W 40/09* (2012.01)
*B60W 50/12* (2012.01)

(52) U.S. Cl.
CPC ........ *B60W 60/0051* (2020.02); *B60W 40/09* (2013.01); *B60W 50/12* (2013.01); *B60W 2556/30* (2020.02)

(58) Field of Classification Search
CPC .. B60W 60/0051; B60W 50/12; B60W 40/09; B60W 2556/30; G06N 5/02; G06F 8/10; G06F 30/00; G06F 30/20; G06F 8/311; G06F 9/546; G06F 2209/547
See application file for complete search history.

(56) References Cited

U.S. PATENT DOCUMENTS

| | | | | |
|---|---|---|---|---|
| 9,298,184 | B2* | 3/2016 | Bartels | ................ B60W 50/082 |
| 9,463,799 | B1* | 10/2016 | Bartels | ............. B60W 60/0051 |
| 9,573,601 | B2* | 2/2017 | Hoye | .................... B60W 50/14 |
| 2007/0076593 | A1* | 4/2007 | Sakurai | ............ B60W 50/0205 370/219 |
| 2013/0145482 | A1* | 6/2013 | Ricci | ........................ G07C 5/02 726/28 |

(Continued)

FOREIGN PATENT DOCUMENTS

| | | |
|---|---|---|
| DE | 102018207172 A1 | 6/2018 |
| WO | 2018146000 A1 | 8/2018 |

OTHER PUBLICATIONS

"IEEE Standard for Verilog Hardware Description Language," in IEEE Std 1364-2005 (Revision of IEEE Std 1364-2001), vol., no., pp. 1-590, Apr. 7, 2006 [online], [retrived on Jul. 10, 2023]. Retrived from the Internet: <URL:ttps://ieeexplore.ieee.org/stamp/stamp.jsp?tp=&arnumber=1620780> (Year: 2006).*

(Continued)

*Primary Examiner* — Peter D Nolan
*Assistant Examiner* — Peter Y Ning
(74) *Attorney, Agent, or Firm* — NORTON ROSE FULBRIGHT US LLP; Gerard A. Messina

(57) ABSTRACT

A method for automating a driving function. The method includes an activation of a process controlling the driving function is triggered using an activation condition modelled by a trigger, and the process is temporally controlled by an activation manager during the controlling of the driving function.

6 Claims, 2 Drawing Sheets

(56) References Cited

U.S. PATENT DOCUMENTS

| | | | |
|---|---|---|---|
| 2015/0025748 A1* | 1/2015 | Hagnander | B60K 28/06 |
| | | | 701/45 |
| 2015/0166059 A1* | 6/2015 | Ko | B60W 30/09 |
| | | | 701/28 |
| 2017/0294120 A1* | 10/2017 | Ootsuji | G08G 1/096725 |
| 2019/0202472 A1* | 7/2019 | Lee | B60W 30/09 |
| 2020/0001893 A1* | 1/2020 | Limbacher | B60W 50/085 |
| 2020/0012280 A1* | 1/2020 | Lin | B60W 60/001 |
| 2021/0179123 A1* | 6/2021 | Yamada | B60T 7/12 |

OTHER PUBLICATIONS

ISO 26262-10 Road Vehicles—Functional safety, Part 10: Guideline on ISO 26262, 2012, 96 pages [retrieved Sep. 7, 2022]. Retrieved from U.S. Appl. No. 13/930,132 as NPL document. (Year: 2012).*

* cited by examiner

METHOD AND DEVICE FOR AUTOMATING A DRIVING FUNCTION

CROSS REFERENCE

The present application claims the benefit under 35 U.S.C. § 119 of German Patent Application No. DE 102019214161.7 filed on Sep. 17, 2019, which is expressly incorporated herein by reference in its entirety.

FIELD

The present invention relates to a method for automating a driving function. The present invention additionally relates to a corresponding device, a corresponding computer program, and a corresponding memory medium.

BACKGROUND INFORMATION

The expression "highly automated driving" (HAD) generally designates a development stage between assisted driving, in which the driver is supported in the driving task by numerous (often separate) driver assistance systems, and autonomous driving, in which the vehicle drives completely autonomously and without action by the driver. In highly automated driving, the vehicle has its own intelligence to some extent, which plans ahead and may take over the driving task at least in most situations. Driver and control units (electronic control units, ECUs) steer the vehicle together, the human driver determining at any time, how intensely he or she intervenes in vehicle handling.

PCT Application No. WO2018146000A1 provides a control unit for a motor vehicle, which is configured to operate multiple applications and pieces of middleware, and includes a memory (shared memory) mutually usable by the applications and the pieces of middleware. The pieces of middleware are configured to carry out an interprocess communication between the applications via the memory.

German Patent Application No. DE 10 2018 207172 A1 describes a method for simulating a cyber-physical system (CPS) in a real operating situation in which measured data and internal states of software components of the system are stored during the operating situation and a simulator is parameterized using the measured data and states.

SUMMARY

The present invention provides a method for automating a driving function, a corresponding device, a corresponding computer program, and a corresponding memory medium.

The approach according to the present invention is based on the finding that numerous driver assistance systems for highly automated driving are presently in the development phase. It is to be expected that the complexity of the corresponding software will exceed all conventional automotive applications by several orders of magnitude.

Furthermore, the present approach underlying the insight is that systems for highly automated driving are technically complex. This likewise applies for future robotic systems. They require high processing power and a large memory, and have significantly increased safety requirements. Taking the functional safety requirements into consideration additionally enhances system complexity.

Lastly, the subsequently described example method in accordance with the present invention takes into account the circumstances that present systems in the automotive sector are often designed as directly communicating applications or components. As soon as data are available, they are immediately provided to other applications. The exact temporal relationship of individual applications may thereby often not be exactly predefined for technical reasons, for example, since the number of independent processing cores remains far behind the number of applications that are able to be executed on them. The exact transmission point in time of specific data is therefore sometimes difficult to determine. The age of the data, which are received by a certain application, is correspondingly unpredictable and is largely a function of runtime conditions.

The method described in German Patent Application No. DE 10 2018 207172 A1 decisively facilitates this situation, since it is unambiguously established for the provided input data which applications receive which data. Thus, the consistency of the data is ensured for arbitrary structures of processes (tasks).

Based on this method, it has proven reasonable to assemble one system from multiple tasks for resimulation and simplification of runtime behavior. In the following, a composite, made from the individual tasks on which a joint activation diagram is based, is designated as an activation table.

The dynamic concept—here, specifically the activation—for such activation tables and their tasks is conventionally supported by periodicity and possibly by individual data-based triggers. Both are generally manually configured or implemented.

One advantage of the approach according to the present invention lies against the background in the creation of an abstract and generic concept for modelling and defining complex activation conditions.

Advantageous refinements and improvements of the present invention are possible due to the measures described herein. Thus, a uniform modelling language may be provided for the activation conditions. These may be compared in this way and thus may be combined in the case of partial agreement, for example, in an activation table, a task, or an alternative thread. The complexity of this type of modeling is limited, for example, in comparison to manually generated source code. This reduces the risk of errors and facilitates an automatic check.

The actual program code for implementing the activation condition may be derived from its abstract definition. Due to the well-defined structure, the functional safety of the generated program code may thus be ensured, even though the modelled activation condition has an origin outside of the middleware development. The flexible distribution of these types of activation conditions is thus also ensured, which may be necessary, for example, in the context of so-called lockstep concepts. Thus, a roughly table-like implementation may be generated for a microcontroller, if this does not permit dynamic loading of program code.

Finally, an activation condition modeled according to the present invention may be automatically transferred into a timing simulation, as is supported, for example, by the software products "Timing-Architects Tool Suite" or "chronSIM." This option supports the single source principle and reduces development complexity.

BRIEF DESCRIPTION OF THE DRAWINGS

Exemplary embodiments of the present invention are shown in the figures and are explained in greater detail below.

DETAILED DESCRIPTION OF EXAMPLE EMBODIMENTS

Figure 1:
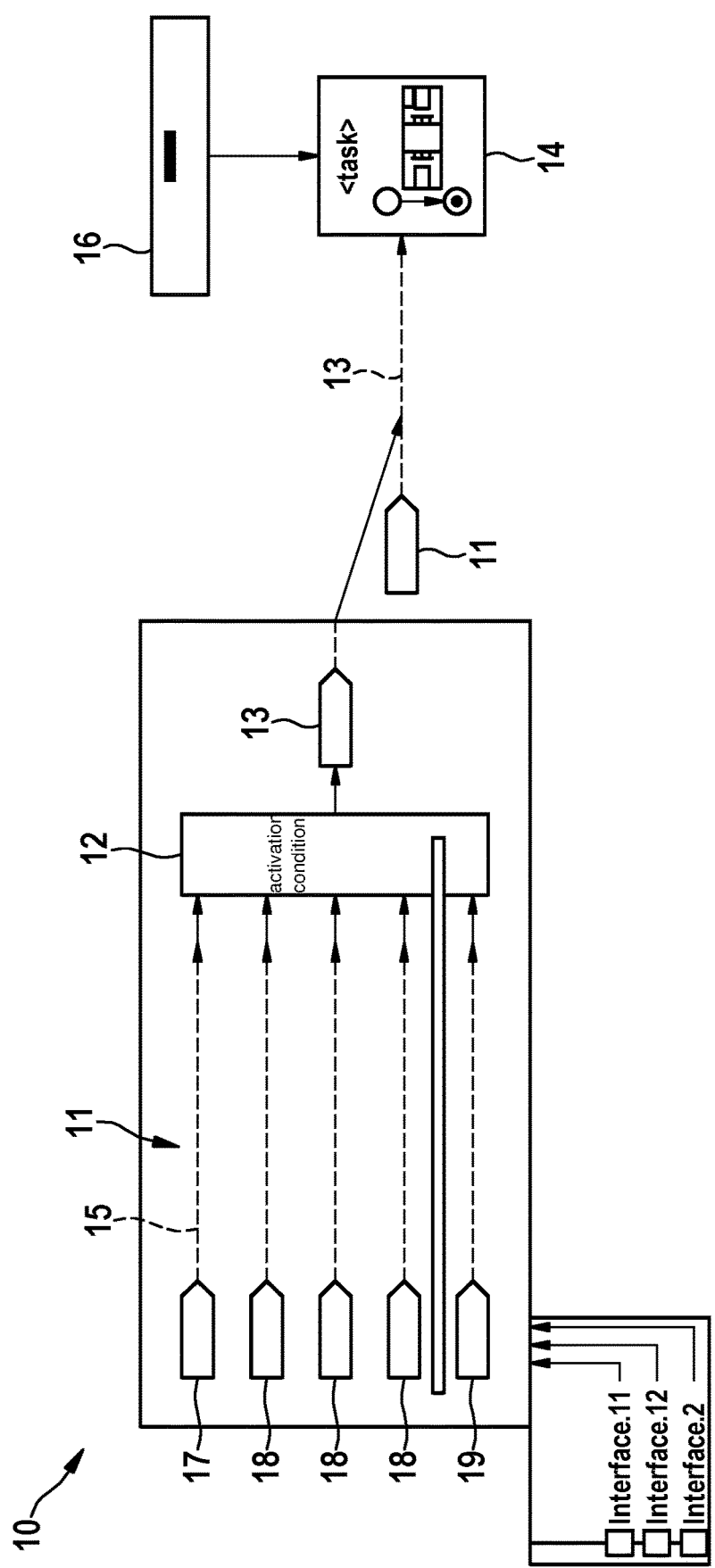
FIG. 1 shows the data flowchart of a method according to a first specific embodiment of the present invention.

FIG. 1 illustrates the basic features of method 10 according to an example embodiment of the present invention on the basis of an automotive operating system. This provides on the one hand periodic 19 triggers or stimuli 11 for activating 13 a process 14, as they are known from the related art. On the other hand, an activation 13—as subsequently described—may be carried out on the basis of predefined events 17, 18.

Middleware-centric stimuli from the IPC 18 are preferably considered as input variables for activation condition 12. These potentially include individual sample values (samples), which are transmitted via the middleware. Basically, all types of event-based stimuli 11 are considered which are encompassed by the model.

Moreover, an activation 13 is preferably provided in the absence of events over a certain period of time, like 100 ms. In this case, the information about the present time-out may be transferred to activating process 14.

A simple modelling language, which is based on Boolean functions according to the present invention, is defined for event-based stimuli 17, 18. According to the present invention, the Boolean functions are hereby expressed in disjunctive normal form (DNF), in particular as a disjunction of product terms. According to one preferred specific embodiment, the Boolean expression is further limited, for example, by excluding the negation (NOT) or contravalence (XOR).

A dot notation is preferably used to more precisely specify IPC stimuli 18. In the following, "eventA" designates such a stimulus 19. The modelling language defines the following Boolean functions:

eventA.any_sample: delivers 1, if a buffered sample value is available or if a new sample value was received since the last activation 13, eventA.new_sample: delivers 1, if a new sample value was received since the last activation 13, eventA.any_newest_sample: delivers the last stored sample value, which is available, thus the most recently received sample value since the last activation 13, eventA.new_newest_sample: delivers the newest of the new sample values, which was received since the last activation 13.

This notation preferably represents both individual sample values and also sets of the same, so that, for example, eventA.any_sample may return a set of sample values. eventA.new_newest_sample, in contrast, always provides one single sample value, namely the newest.

IPC stimuli 18 indicated in this dot notation are then used as arguments of predicates, which they map onto logical values. IPC stimuli 18 may hereby preferably be specified on the basis of their sequence numbers or time stamps, in particular if these are known to the middleware and are transported according to them.

In addition to predicates for determining the equivalence of sequence numbers (for example: "seq eq(eventA.any_sample, eventB.any_sample)")—optionally while specifying an offset—other predicates are preferably provided with a predefined interval for the comparison of sequence numbers and time stamps. For time stamps, such a predicate might correspond to the following form:

tstamp_is_inside_interval(eventA.new_sample, eventB.any_sample, tearly, tlate)

As these examples already demonstrate, two-digit or multi-digit predicates are considered for the described modelling language without departing from the scope of the invention.

Figure 2:
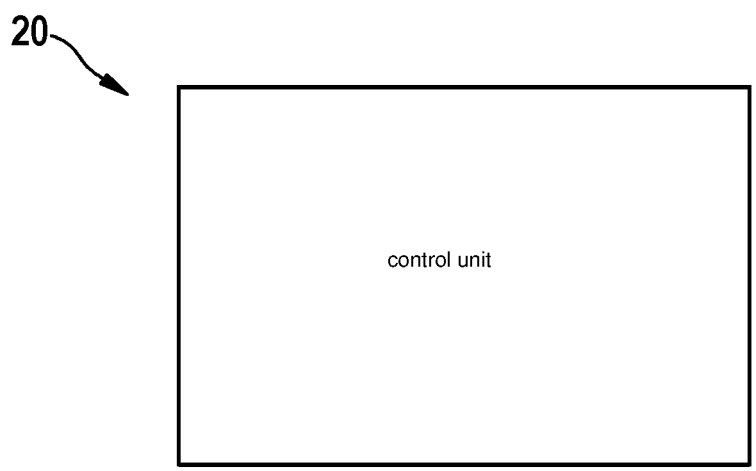
FIG. 2 schematically shows a control unit according to a second specific embodiment of the present invention.

This method 10 may be implemented, for example, in software or hardware or in a mixed form of software and hardware, for example, in a control unit 20, as the schematic depiction of FIG. 2 illustrates.

What is claimed is:

1. A method for automating a driving function, comprising the following steps:
triggering, using an activation condition modelled by a trigger, an activation of a process controlling the driving function; and
temporally controlling, by an activation manager, the process, during the controlling of the driving function, wherein:
the interprocess communication is carried out via middleware interfaces,
the activation condition is modelled using a predefined modelling language, and
states of the interfaces are expressed in the modelling language by Boolean variables, and the modeling language includes Boolean functions of the variables and comparison predicates for time stamps and sequence numbers.

2. The method as recited in claim 1, wherein the functions are expressed in the modelling language in disjunctive normal form.

3. The method as recited in claim 1, wherein the trigger is transferred to the process in the case of an activation.

4. The method as recited in claim 1, further comprising at least one of the following:
the triggering is carried out by an interprocess communication, or
the triggering is carried out periodically.

5. A non-transitory machine-readable memory medium on which is stored a computer program for automating a driving function, the computer program, when executed by a computer, causing the computer to perform the following steps:
triggering, using an activation condition modelled by a trigger, an activation of a process controlling the driving function; and
temporally controlling, by an activation manager, the process, during the controlling of the driving function, wherein:
the activation condition is modelled using a predefined modelling language, and
states of the interfaces are expressed in the modelling language by Boolean variables, and the modeling language includes Boolean functions of the variables and comparison predicates for time stamps and sequence numbers.

6. A device for automating a driving function, the device configured to:
trigger, using an activation condition modelled by a trigger, an activation of a process controlling the driving function; and
temporally control, by an activation manager, the process, during the controlling of the driving function, wherein:
the activation condition is modelled using a predefined modelling language, and
states of the interfaces are expressed in the modelling language by Boolean variables, and the modeling language includes Boolean functions of the variables and comparison predicates for time stamps and sequence numbers.

* * * * *